B. F. Perkins,
Stop Cock,
N° 82,870.        Patented Oct. 6, 1868.
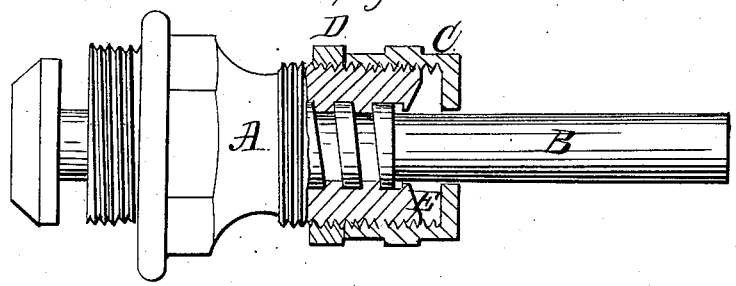
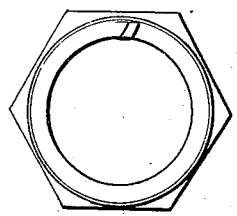
Witnesses.
Wm C. Healy
J. F. Barrett
Inventor
B F Perkins

BENJAMIN F. PERKINS, OF HOLYOKE, MASSACHUSETTS.

Letters Patent No. 82,870, dated October 6, 1868.

IMPROVEMENT IN GLOBE-VALVES FOR STEAM-ENGINES.

The Schedule referred to in these Letters Patent and making part of the same.

*To all whom it may concern:*

Be it known that I, BENJAMIN F. PERKINS, of Holyoke, county of Hampden, and State of Massachusetts, have invented a new and useful Improvement on Valves; and I do hereby declare that the following is a full, clear, and exact description of the construction and operation of the same, reference being had to the accompanying drawings, and to the letters of reference marked thereon, making a part of this specification, in which—

Figure 1 is a side elevation, a part in section, of a valve-stand and spindle, to a common globe or angle-valve, the body of the valve, and the wheel to turn the spindle, being omitted.

Figure 2 is a plan of the improvement.

The same letters indicate like parts in each of the figures.

My improvement is on that class of valves known as the globe and angle-valves, and used to stop or regulate the flow of fluids through pipes, and consists in so combining and arranging a lock-nut with the stand and packing-nut, as to lock the packing-nut, so that it will not turn off when the spindle is turned to open the valve.

To enable others to make and use my invention, I will describe its construction and operation, as follows:

A and B, fig. 1, is an ordinary globe or angle-valve, stand, and spindle; C, the packing-nut, and D the nut for locking the same.

Fig. 2 is a plan of the nut D. I construct D of the same internal diameter and the same screw-thread as C. I turn D down on A, fill the space E with packing, turn down C until the packing is sufficiently dense to prevent leakage, when the lock-nut D is turned up tight against C, as shown in the drawing, and the packing-nut is securely locked.

The advantage of this arrangement is that the packing-nut can be placed in any position, and the lock-nut will hold it there; but with the old arrangement, the packing will adhere to the spindle, causing more friction than there is in the screw-threads on A and C, so that when the spindle B is turned, the packing-nut will turn off from A, and allow the valve to leak around the spindle, or at the joint between the packing-nut and the stand; but with the use of the nut D, the packing-nut cannot be loosened by turning the spindle, and the packing will last much longer, thus saving much labor in packing and damage from waste.

I am aware that lock-nuts have long been in use for locking bolts and nuts, also for locking the packing-boxes on valve-rods on steam-engines, and I do not claim broadly the use of a lock-nut for confining another nut in place, nor in any way except as a part of the arrangement and application described; but What I do claim as new, and desire to secure by Letters Patent, is—

The combination and arrangement of the lock-nut D with the stand A and packing-nut C, of a globe or angle-valve, substantially as herein described.

B. F. PERKINS.

Witnesses:
WM. C. HEALY,
S. F. BARRETT.